(12) United States Patent
Bodner et al.

(10) Patent No.: US 11,173,943 B2
(45) Date of Patent: Nov. 16, 2021

(54) PORTABLE STORAGE SLED

(71) Applicants: Christian P. Bodner, Old Greenwich, CT (US); Michael Carroll, Westbury, NY (US)

(72) Inventors: Christian P. Bodner, Old Greenwich, CT (US); Michael Carroll, Westbury, NY (US)

(*) Notice: Subject to any disclaimer, the term of this patent is extended or adjusted under 35 U.S.C. 154(b) by 0 days.

(21) Appl. No.: 16/622,874

(22) PCT Filed: Jun. 18, 2018

(86) PCT No.: PCT/US2018/038135
§ 371 (c)(1),
(2) Date: Dec. 13, 2019

(87) PCT Pub. No.: WO2018/232420
PCT Pub. Date: Dec. 20, 2018

(65) Prior Publication Data
US 2020/0207397 A1    Jul. 2, 2020

Related U.S. Application Data

(60) Provisional application No. 62/521,152, filed on Jun. 16, 2017.

(51) Int. Cl.
*B62B 15/00* (2020.01)
*B62B 19/02* (2006.01)

(52) U.S. Cl.
CPC ........... *B62B 15/007* (2013.01); *B62B 19/02* (2013.01); *B62B 2202/52* (2013.01); *B62B 2204/06* (2013.01); *B62B 2205/02* (2013.01)

(58) Field of Classification Search
CPC ....... B62B 15/007; B62B 13/02; B62B 13/12; B62B 13/06; B62B 19/02; B62B 2202/52; B62B 2204/06; B62B 2205/02

USPC .......................................................... 280/845
See application file for complete search history.

(56) References Cited

U.S. PATENT DOCUMENTS

| 259,822 A | 6/1882 | Conwell ........................ 280/20 |
| 1,030,170 A * | 6/1912 | Evans .................... B62B 13/16 |
| | | 280/20 |

(Continued)

FOREIGN PATENT DOCUMENTS

EP    1602548 A1    12/2005    ............. B62B 13/16

OTHER PUBLICATIONS

The Notification Concerning Transmittal of International Preliminary Report on Patentability (Chapter I of the Patent Cooperation Treaty), dated Dec. 26, 2019, which was issued by the International Bureau of WIPO in Applicants' corresponding international PCT application having Serial No. PCT/US2018/038135, filed on Jun. 18, 2018.

(Continued)

*Primary Examiner* — John D Walters

(57) ABSTRACT

A portable storage sled for transporting equipment includes a first elongated member and a second elongated member. At least one connecting member joins the first elongated member to the second elongated member. Each of the first elongated member and the second elongated member includes an extension member that is selectively retractable and extendable therefrom. The first elongated member, the second elongated member, the first extension member and the second extension member include a plurality of ridges extending upwardly therefrom that form an equipment mount between which the equipment is situated. The portable storage sled is selectively adjustable in length and width so that equipment of various sizes can be situated thereon.

19 Claims, 14 Drawing Sheets

(56) References Cited

U.S. PATENT DOCUMENTS

| | | | | |
|---|---|---|---|---|
| 1,070,915 | A | * | 8/1913 | Reisinger ................ B62B 13/16 |
| | | | | 280/20 |
| 2,717,159 | A | | 9/1955 | Thomas ........................ 280/845 |
| 3,912,290 | A | * | 10/1975 | Rich .......................... B62B 3/02 |
| | | | | 280/9 |
| 4,166,638 | A | | 9/1979 | De Prado ...................... 280/638 |
| 4,294,457 | A | | 10/1981 | Thiboutot ....................... 280/20 |
| 9,340,224 | B2 | | 5/2016 | Yoder et al. |
| 2005/0218629 | A1 | * | 10/2005 | Stacy ...................... B62B 13/00 |
| | | | | 280/639 |
| 2009/0283978 | A1 | | 11/2009 | Fitzgerald ...................... 280/20 |

OTHER PUBLICATIONS

The International Preliminary Report on Patentability (Chapter I of the Patent Cooperation Treaty), dated Dec. 17, 2019, which was issued by the International Bureau of WIPO in Applicants' corresponding international PCT application having Serial No. PCT/US2018/038135, filed on Jun. 18, 2018.

The Written Opinion of the International Searching Authority, dated Sep. 14, 2018, which was issued by the International Bureau of WIPO in Applicants' corresponding international PCT application having Serial No. PCT/US2018/038135, filed on Jun. 18, 2018.

The International Search Report, dated Sep. 14, 2018, which was issued by the International Bureau of WIPO in Applicants' corresponding international PCT application having Serial No. PCT/US2018/038135, filed on Jun. 18, 2018.

Supplementary European Search Report and Annex to the European Search Report, in English, dated Feb. 22, 2021, issued from the European Patent Office for Applicants' corresponding European Patent Application No. EP18817192.0, filed on Jan. 16, 2020.

* cited by examiner

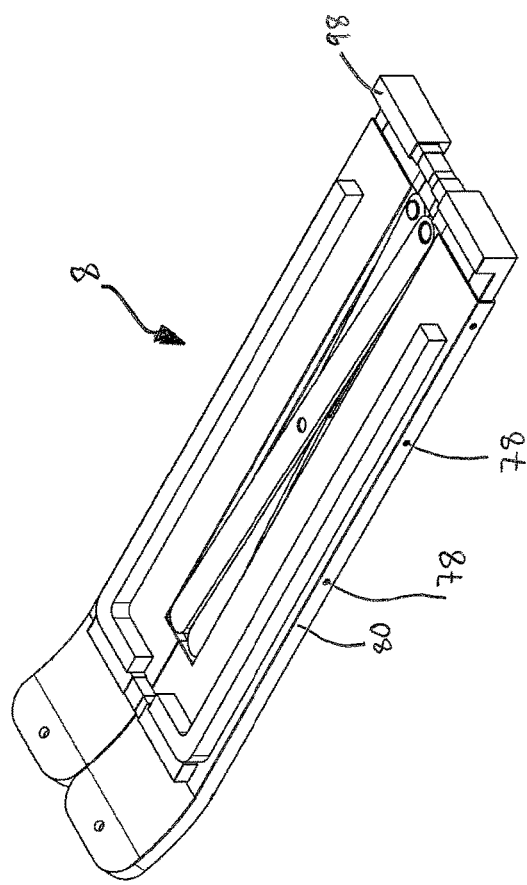
FIG. 5
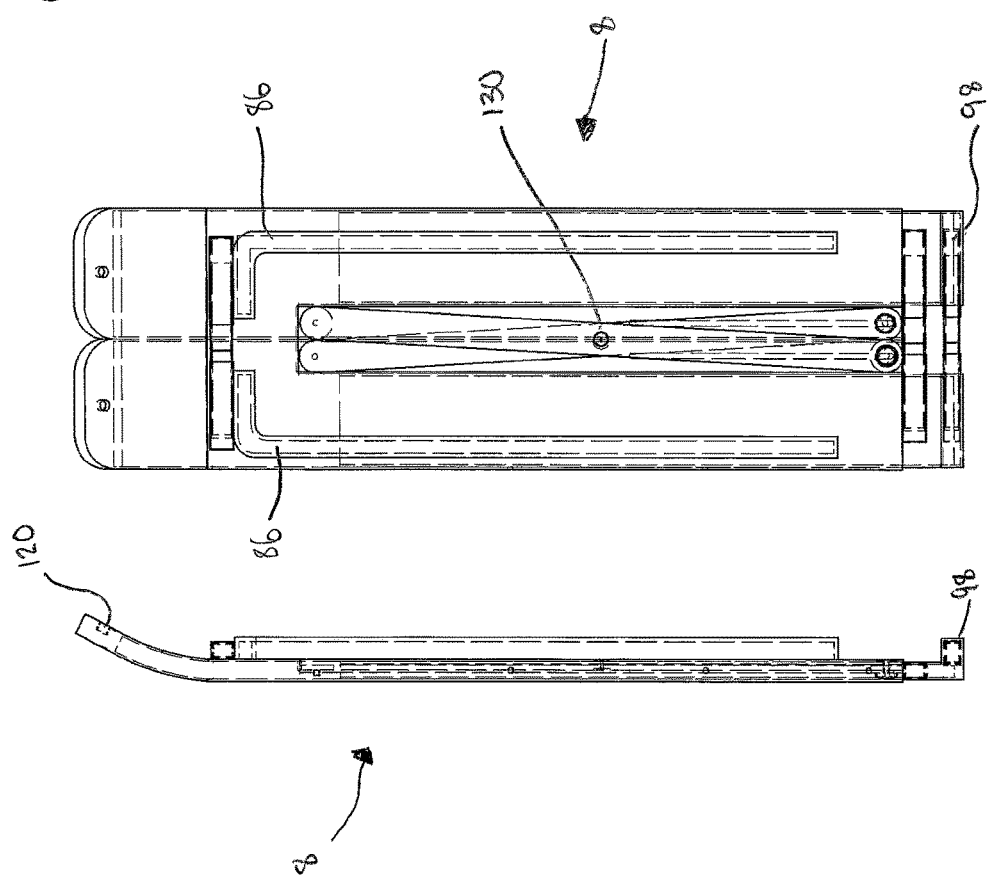
FIG. 4
FIG. 3

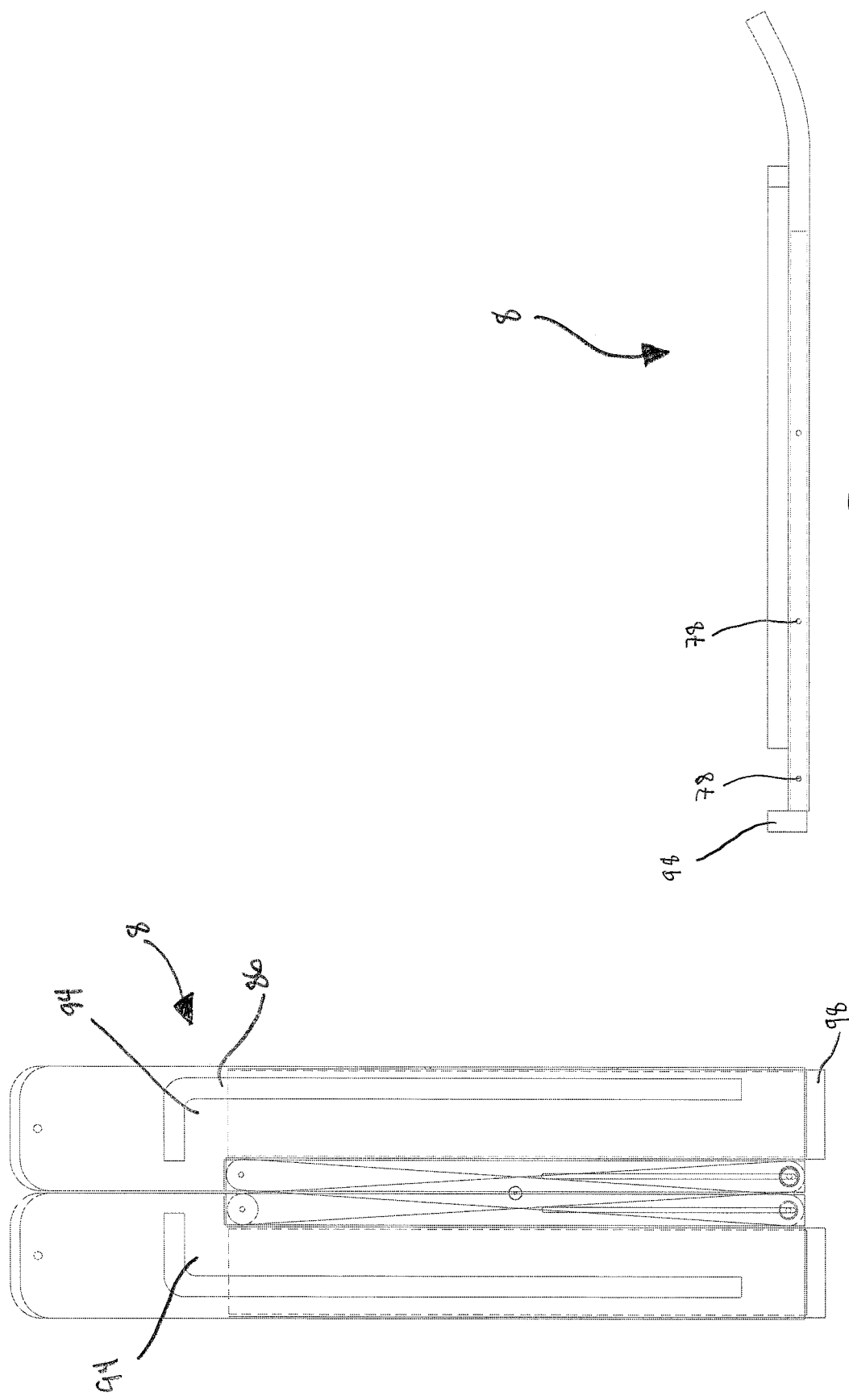

PORTABLE STORAGE SLED

CROSS-REFERENCE TO RELATED APPLICATIONS

This application is related to U.S. Provisional Patent Application Ser. No. 62/521,152, filed on Jun. 16, 2017, and entitled "Portable Storage Sled", the disclosure of which is hereby incorporated by reference and on which priority is hereby claimed.

BACKGROUND OF THE INVENTION

Field of the Invention

The present invention generally relates to sleds for transporting equipment, and more particularly relates to collapsible sleds for transporting coolers.

Description of the Prior Art

Portable coolers are constructed in a variety of shapes and sizes to accommodate different quantities of food and drink products. Large coolers, which are difficult to transport, often include various devices to assist users in carrying the cooler. For example, some coolers are formed with handles extending from the sides thereof that a user, or two users, may grab to carry the cooler. Other larger coolers have wheels integrally formed therein, along with an extendible handle, so that a user may wheel the cooler and products stored therein to a more distant location along hardened surfaces such as concrete or asphalt walkways. While the wheels may assist a user in carrying a cooler on such hardened surfaces, the wheels are often not effective on soft surfaces such as sand, dirt and snow.

As can be seen in FIG. 1 of the drawings, when a user pulls a wheeled cooler 2 off a hardened walkway onto a soft surface, for example, onto a sandy beach, the wheels 4 often sink into the sand 6 making it difficult to transport the cooler 2. One possible solution for transporting coolers on soft surfaces is to put the cooler in a general purpose sled (e.g., a snow sled); however, such sleds are typically large, bulky, not readily storable and therefore impractical for travel purposes. Furthermore, general purpose sleds often lack sufficient means for securing the cooler therein, which allows the cooler to uncontrollably slide within the sled.

OBJECTS AND SUMMARY OF THE INVENTION

It is an object of the present invention to provide a portable storage sled for transporting equipment.

It is another object of the present invention to provide a portable storage sled for transporting equipment that is selectively adjustable between a collapsed state and an expanded state.

It is yet a further object of the present invention to provide a portable storage sled for transporting equipment that is selectively adjustable in size to receive and transport equipment of various sizes.

In accordance with one form of the present invention, a portable storage sled for transporting equipment is provided. The sled includes a first elongated member and a second elongated member, the first elongated member and the second elongated member being situated opposite and parallel to one other. The first elongated member and the second elongated member are joined to one another. The first elongated member and the second elongated member are selectively adjustable outwardly from one another and inwardly towards one another between an expanded state and a collapsed state. Each elongated member preferably includes a recess into which an extension member is received. Each extension member may be selectively extended and retracted from the elongated member to vary the overall length of the elongated member. Each of the elongated members includes a top surface having a ridge extending upwardly therefrom that forms a mount for holding equipment. Each of the extension members includes a first axial end and an oppositely disposed second axial, the first axial end being situated in the recess of a respective elongated member. The second axial ends of the extension members include a ridge extending upwardly therefrom that forms part of the mount for holding equipment. The elongated members and extension members are selectively adjustable to conform to the shape of the equipment being transported thereon.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 3 is a left elevational view of the portable storage sled formed in accordance with the present invention, showing the sled in a collapsed state.

FIG. 4 is a top plan view of the portable storage sled formed in accordance with the present invention, showing the sled in a collapsed state.

FIG. 5 a left, top perspective view of the portable storage sled formed in accordance with the present invention, showing the sled in a collapsed state.

FIG. 6 is another top plan view of the portable storage sled formed in accordance with the present invention, showing the sled in a collapsed state.

FIG. 7 is a right elevational view of the portable storage sled formed in accordance with the present invention, showing the sled in a collapsed state.

DETAILED DESCRIPTION OF THE PREFERRED EMBODIMENTS

Figure 1:
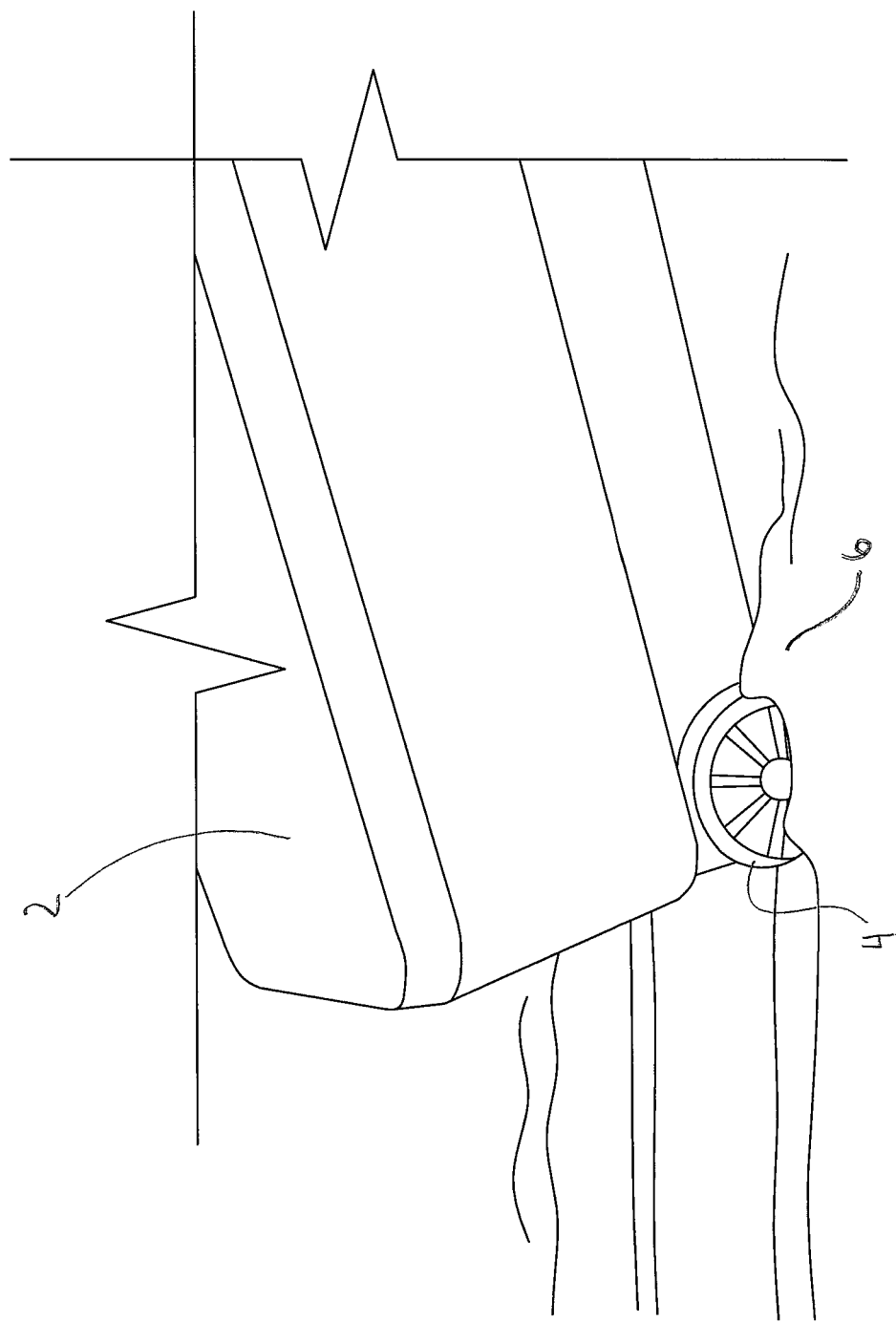
FIG. 1 is a side perspective view of a cooler being pulled through the sand.

Reference should initially be made to FIGS. 2-7 of the drawings, where it can be seen that a portable storage sled 8 formed in accordance with one form of the present invention preferably comprises at least a first elongated member 10 and a second elongated member 12 that are situated opposite and parallel to one another. As will be described in greater detail in the forthcoming paragraphs, the distance between the two elongated members 10, 12 may be selectively adjusted to vary the width of the portable storage sled 8 so that it may accommodate coolers 2 of various sizes, as well as other storage containers.

Each of the elongated members 10, 12 includes a first axial end 14 and an oppositely disposed second axial end 16. Preferably, the first axial end 14 of each elongated member 10, 12 includes an upwardly curved portion 18 so that when the sled 8 is pulled in a forward direction over a surface by a user, the first axial ends 14 do not dig into the surface. In another embodiment of the present invention, the second axial ends 16 of the elongated members 10, 12 may also include an upwardly curved portion (not shown) so that if the sled 8 is pulled in a reversed direction, the second axial ends 16 of the elongated members 10, 12 also do not dig into the surface.

The elongated members 10, 12 are preferably coupled to one another to enable the portable transportation sled 8 formed thereby to be selectively adjusted between a collapsed state, as shown in FIGS. 2-7 of the drawings, and an expanded state, as shown in FIGS. 8-13 of the drawings. In the collapsed state, the two elongated members 10, 12 are in close proximity to one another so that the distance between the elongated members 10, 12 and the overall width of the sled 8 is minimized. A user may store the collapsed sled 8 in a backpack or bag 20 when not in use, as shown in FIG. 14 of the drawings. When the sled 8 is going to be utilized to carry a cooler 2 or another object, a user may configure the sled 8 into the expanded state wherein the distance between the two elongated members 10, 12 is selectively increased.

A can be seen in FIGS. 2-11 of the drawings, in a first embodiment of the present invention, the first and second elongated members 10, 12 may be coupled to one another by a scissor-type connector 22. The scissor-type connector 22 preferably includes a first connecting member 24 and a second connecting member 26. Each of the first and second connecting members 24, 26 has a first axial end 28 and second axial end 30 disposed opposite the first axial end 28. As will be described in greater detail in the forthcoming paragraphs, the axial ends 28, 30 of the first and second connecting members 24, 26 are engageable with the first and second elongated members 10, 12. The connecting members 24, 26 may also be joined together at a center portion thereof by a connector 130.

Each of the elongated members 10, 12 preferably includes a recessed portion 32 that extends at least partially along an inner edge 34 thereof. Each recessed portion 32 includes a first end 36 and a second end 38 situated opposite the first end 36. An opening 40 is formed in proximity to the first end 36 of each recessed portion 32 and extends at least partially through the thickness of each elongated member 10, 12. A corresponding opening 42 is formed in proximity to the first axial end 28 of each connecting member 24, 26. The opening 42 formed in proximity to the first axial end 28 of the first connecting member 24 is situated over, and aligned with, the opening 40 formed in proximity to the first end 36 of the recessed portion 32 in the first elongated member 10 so that a pin, bolt or other fastening means 44 can be inserted through the aligned openings 40, 42 to join the first axial end 28 of the first connecting member 24 to the first elongated member 10. Similarly, the opening 42 formed in proximity to the first axial end 28 of the second connecting member 26 is situated over, and aligned with, the opening 40 formed in proximity to the first end 36 of the recessed portion 32 in the second elongated member 12 so that a pin, bolt or other fastening means 44 can be inserted through the aligned openings 40, 42 to join the first axial end 28 of the second connecting member 26 to the second elongated member 12. Alternatively, each of the first connecting member 24 and the second connecting member 26 may include a pin extending downwardly therefrom in proximity to the first axial ends 28 thereof that may engage the openings 40 in the recessed portions 32 of the elongated members 10, 12. Furthermore, it is also envisioned to be within the scope of the present invention to utilize each of the aforementioned structures without the utilization of the recess 32 and the cooler will at least partially rest on the connecting members 24, 26.

Each recessed portion 32 may further include a slot 46 formed in proximity to the second end 38 thereof that extends at least partially along the axial length of the recessed portion 32. The slot 46 preferably extends at least partially through the thickness of each of the elongated members 10, 12 and includes a first axial end 48 and an oppositely disposed second axial end 50. The second axial end 30 of each of the connecting members 24, 26 includes an opening 52 formed at least partially therethrough. The opening 52 in the second axial end 30 of the first connecting member 24 is aligned with the slot 46 formed in the second elongated member 12. The opening 52 in the second axial end 30 of the second connecting member 26 is aligned with the slot 46 formed in the first elongated member 10. A connector 54, such as a pin, bolt or other connecting means is inserted through each respective aligned opening 52 and slot 46 to engage the second axial end 30 of the first connecting member 24 with the slot 46 in the second elongated member 12 and to engage the second axial end 30 of the second connecting member 26 with the slot 46 in the first elongated member 10. Preferably, the second axial ends 30 of the connecting members 24, 26 are engaged with the slots 46 so that the connectors 54, and second axial ends 30 of the connecting members 24, 26 attached thereto, can reciprocatingly slide along the axial length of their respective slot 46. Alternatively, each of the first connecting member 24 and the second connecting member 26 may include a pin extending downwardly therefrom in proximity to the second axial ends 30 thereof that may engage the slots 46 in the recessed portions 32 of the elongated members 10, 12.

Figure 17:
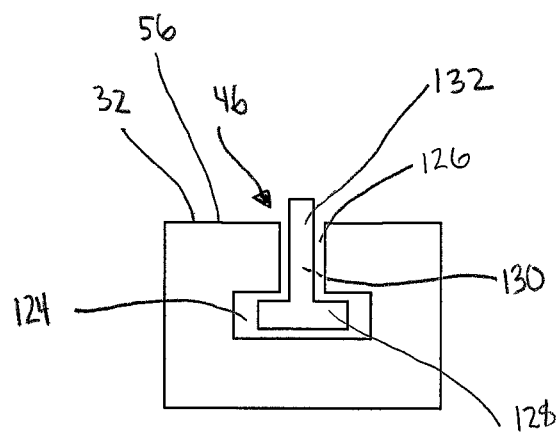
FIG. 17 is a rear cross-sectional view of the slot in the elongated member of the sled formed in accordance with the present invention.

In one form, the slot 46 may have a T-shaped cross section, as shown in FIG. 17 of the drawings. The T-shaped cross section includes a horizontal portion 124 and a vertical portion 126 extending upwardly therefrom towards and through the top surface 56 of the recessed portion 32. The horizontal portion 124 is preferably situated within the thickness of the elongated member 10, 12. The horizontal portion 124 is preferably dimensioned so that the head 128 of a bolt 130 or the nut of a bolt, or a enlarged portion of the shaft of the connector 54, may be situated therein and so that the head 128 or nut of the bolt 130 may reciprocatingly slide along the length of the slot 46, within the horizontal portion 124 of the slot 46. It is also envisioned to be within the scope of the present invention to utilize rivets or other connectors that are situated at least partially within the horizontal portion 124 of the slot 46. Similarly, the vertical portion 126 of the slot 46 is preferably dimensioned so that the shaft portion 132 of the bolt 130 or other connector 54 can be situated therein. The shaft 132 preferably extends at least partially outwardly from the top surface 56 of the recessed portion 32 so that it may extend through the opening 52 formed in the second axial end 30 of the connecting member 24, 26. If the connector is a bolt, a nut can be threaded onto the end of the shaft 132 passing through the opening 52 in the second axial end 30 so that connector joins the connecting member 24, 26 to a respective elongated member 10, 12. The horizontal portion 124 of the slot 46 is preferably larger than the vertical portion 126 to accommodate the head 128 of the connector. Additionally, since the vertical portion 126 is smaller than the diameter of the head 128 of the connector, the connector cannot be pulled outwardly from the slot 46 and is only movable along the length of the slot 46.

The recessed portions 32 are preferably dimensioned so that the top surfaces 58 of the connecting members 24, 26 are lower than the top surfaces 60 of the elongated members 10, 12. Accordingly, when a cooler 2 is placed on the portable storage sled 8 formed in accordance with the present invention, the weight is supported by the elongated members 10, 12 as opposed to the connecting members 24, 26.

As can be seen in FIGS. 8-13 of the drawings, when the sled 8 is in an expanded state, the second axial ends 30 of the connecting members 24, 26 are situated in proximity to the first axial ends 48 of the slots 46. When the sled 8 is in a collapsed state, as shown in FIGS. 2-7 of the drawings, the second axial ends 30 of the connecting members 24, 26 are situated in proximity to the second axial ends 50 of the slots 46. Accordingly, the reciprocating movement of the connecting members 24, 26 within the slots 46 allows the distance between the elongated members 10, 12 to be selectively increased, thereby expanding the sled 8, and decreased, thereby collapsing the sled 8. As will be explained in greater detail, the distance between the elongated members 10, 12 is adjusted to fit against the edges 64 on the bottom surface 62 of a cooler 2 or other storage device.

Figure 18:
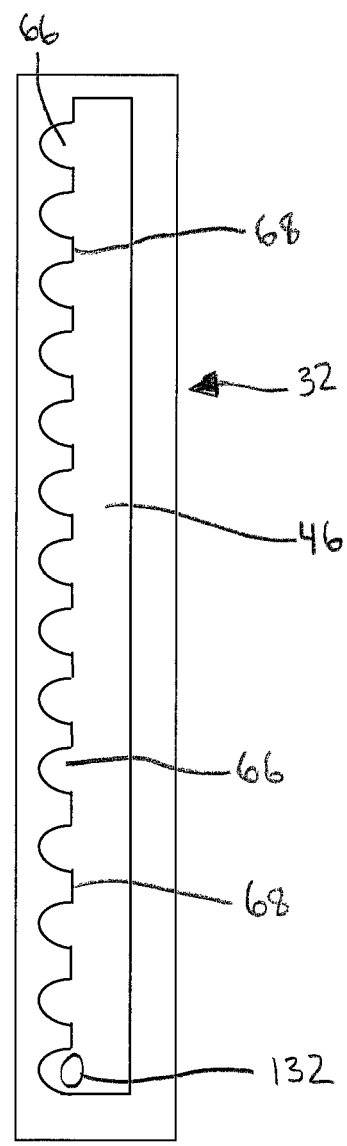
FIG. 18 is a top plan view of the slot of the elongated member of the sled formed in accordance with the present invention.
Figure 20:
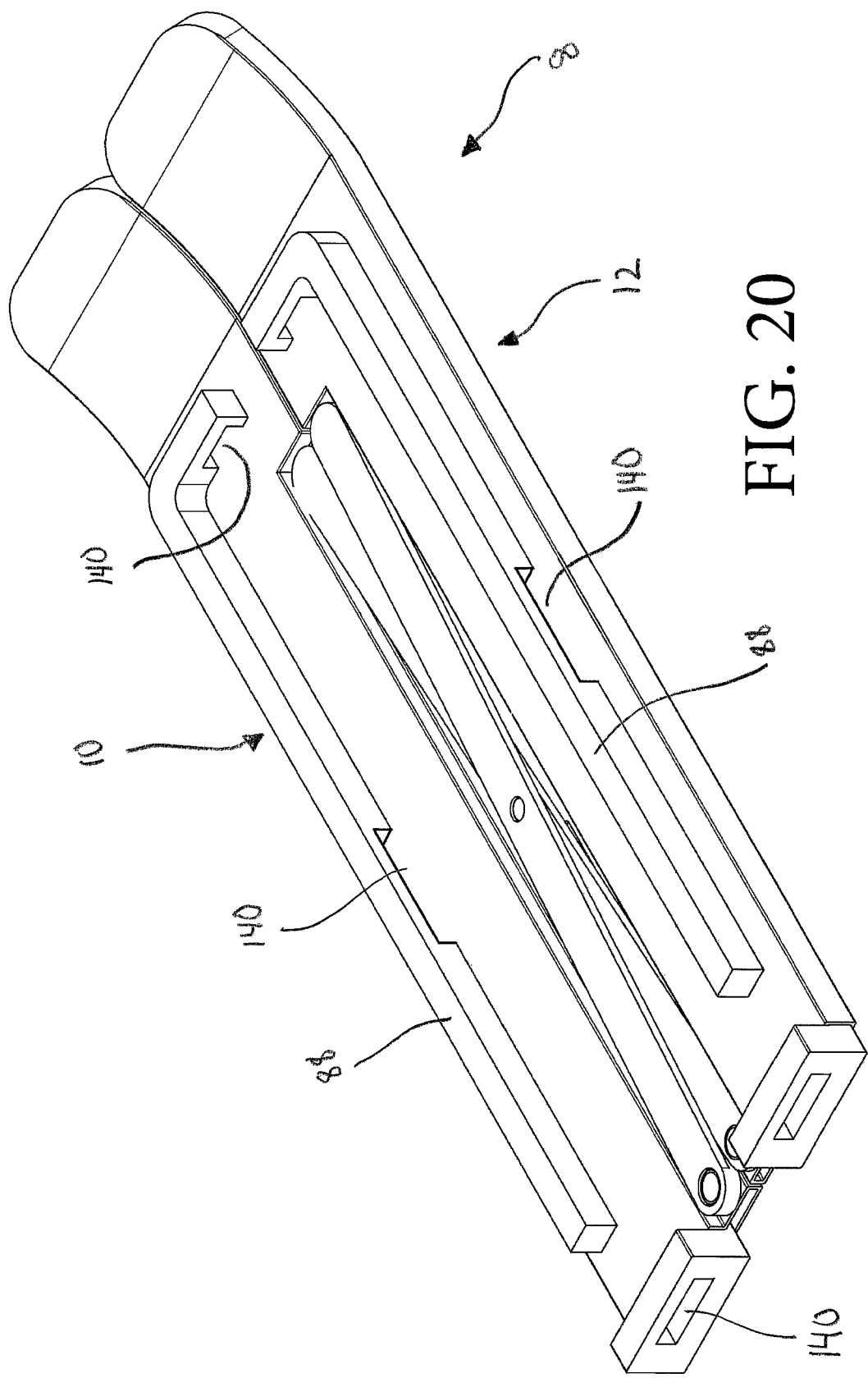
FIG. 20 is a right, top perspective view of another embodiment of the portable storage sled formed in accordance with the present invention, showing the sled in a collapsed state.

As can be seen in FIG. 18 of the drawings, each slot 46 may further include recesses 66 and indents 68 along the axial length thereof into which the shaft 132 of the connector 54 may be inserted. More specifically, when the distance between the two elongated members 10, 12 has been selectively adjusted by the user to a desired width, the shaft 132 of the connector 54 at the second axial end 30 of the first connecting member 24 may be inserted into one of the recesses 66 in the slot 46 in the second elongated member 12 and the shaft 132 of the connector 54 at the second axial end 30 of the second connecting member 26 may be inserted into one of the recesses 66 in the slot 46 in the first elongated member 10. Accordingly, when the connectors 54 are inserted into the recesses 66, linear movement of the second axial ends 30 of the connecting members 24, 26 in the slots 46 is limited so that the distance between the elongated members 10, 12 is fixed.

The elongated members 10, 12 are also formed so that the length of each member 10, 12 may be selectively adjusted. More specifically, as can be seen in FIGS. 3, 4, 6 and 9-11 of the drawings, each elongated member 10, 12 preferably includes an internal cavity 70 that extends at least partially along the axial length thereof. An extension member 72 having a first axial end 74 and an oppositely disposed second axial end 76 is receivable within the internal cavity 70 of each elongated member 10, 12, the extension member 72 being selectively, reciprocatingly extendable and retractable therefrom. As can be seen in FIGS. 2-7 of the drawings, in a retracted state, the extension member 72 may be stored at least partially within the internal cavity 70 of the elongated member 10, 12. In an extended state, as shown in FIGS. 8-13 of the drawings, the extension member 72 may be selectively extended from the internal cavity 70 to a desired length.

The internal cavity 70 and the extension member 72 preferably include fixation means so that when the extension member 72 has been extended to lengthen the elongated member 10, 12, the extension member 72 and the internal cavity 70 of the elongated member 10, 12 may engage one another so that they are at least temporarily affixed together. For example, as shown in FIGS. 3, 5, 7, 9, 11 and 12 of the drawings, the internal cavity 70 may have a series of holes 78 along the axial walls 80 thereof that may be engaged with a series of corresponding indents 82 formed in the axial edges 84 of the extension members 72. A user may apply force to pull the extension member 72 from the internal cavity 70 to bias the indents 82 in and out of the holes 78. When elongated member 10, 12 is adjusted to a desired length, the corresponding indent 82 and hole 78 engage one another and resist movement of the extension member 72 within the internal cavity 70.

Figure 2:
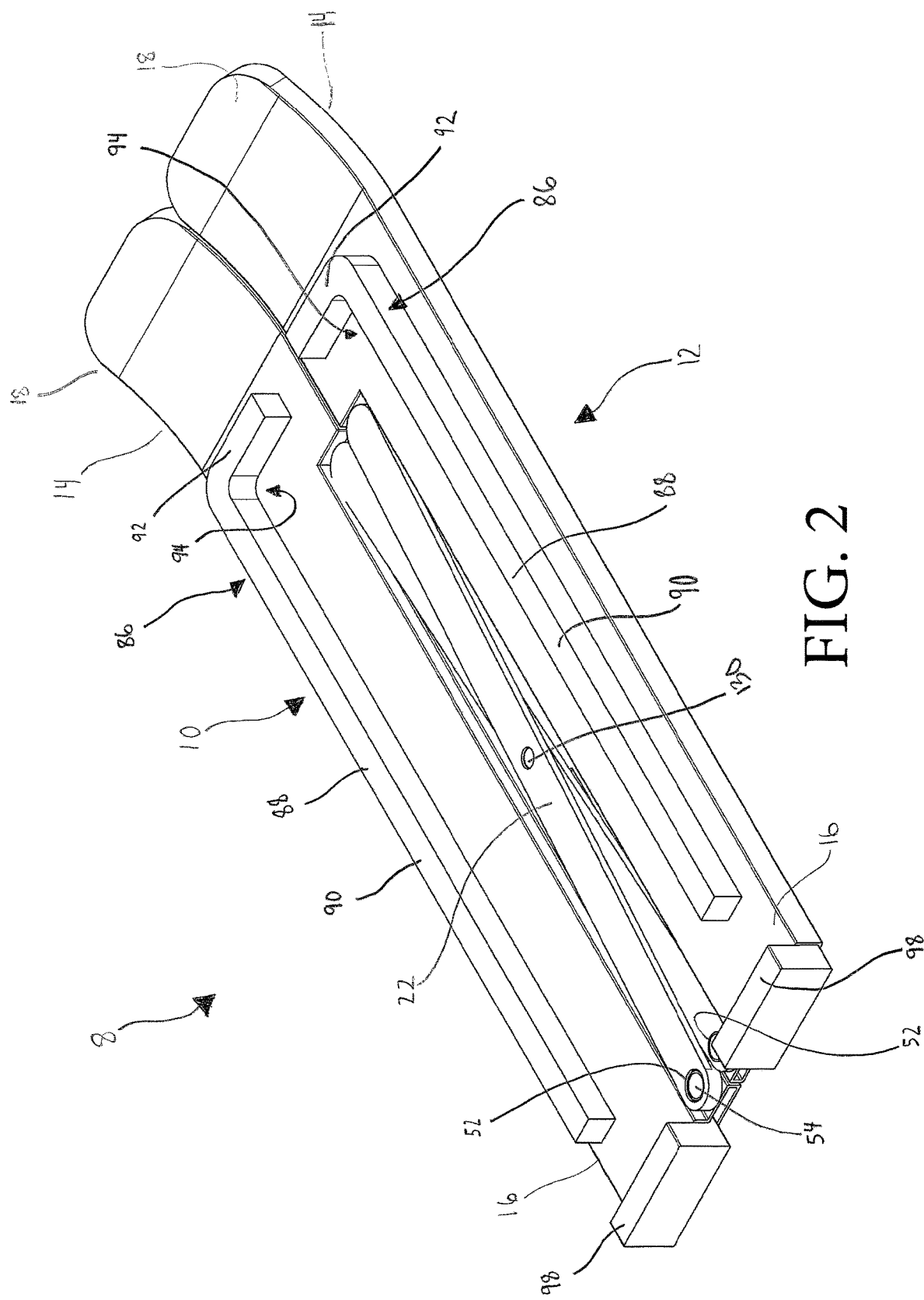
FIG. 2 is a right, top perspective view of the portable storage sled formed in accordance with the present invention, showing the sled in a collapsed state.
Figure 8:
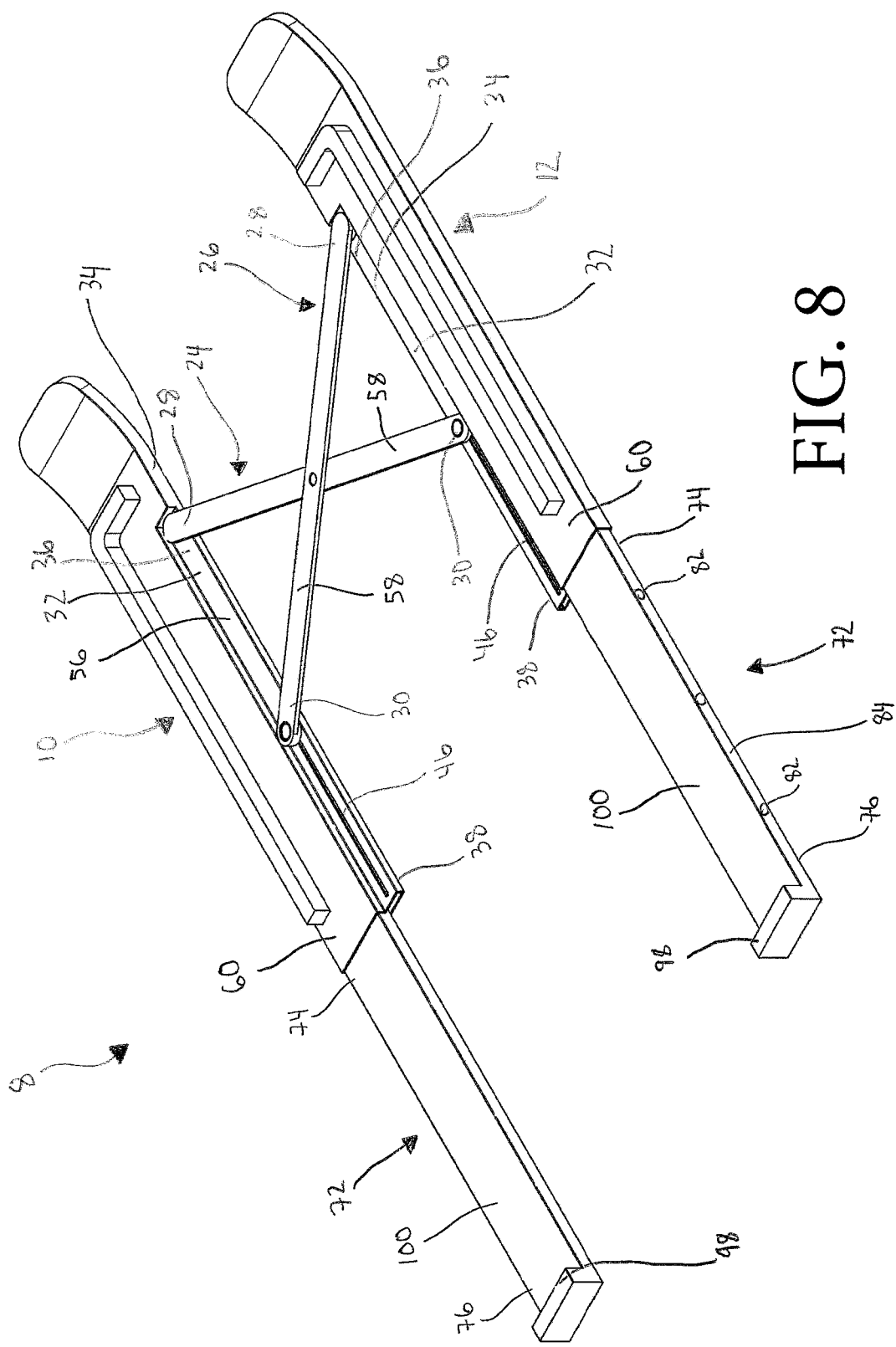
FIG. 8 is a right, top perspective view of the portable storage sled formed in accordance with the present invention, showing the sled in an expanded state.
Figure 9:
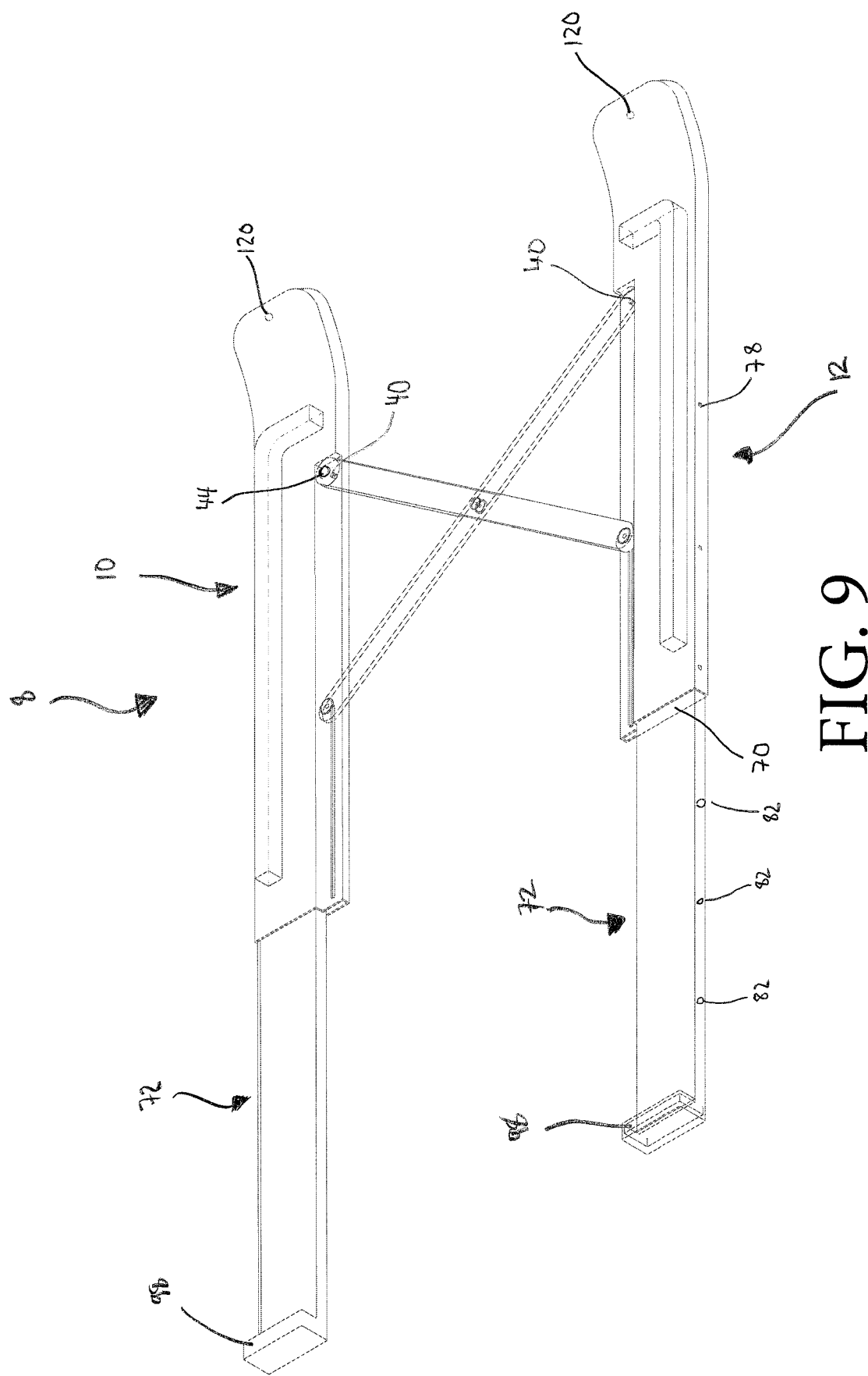
FIG. 9 is another right, top perspective view of the portable storage sled formed in accordance with the present invention, showing the sled in an expanded state.
Figure 10:
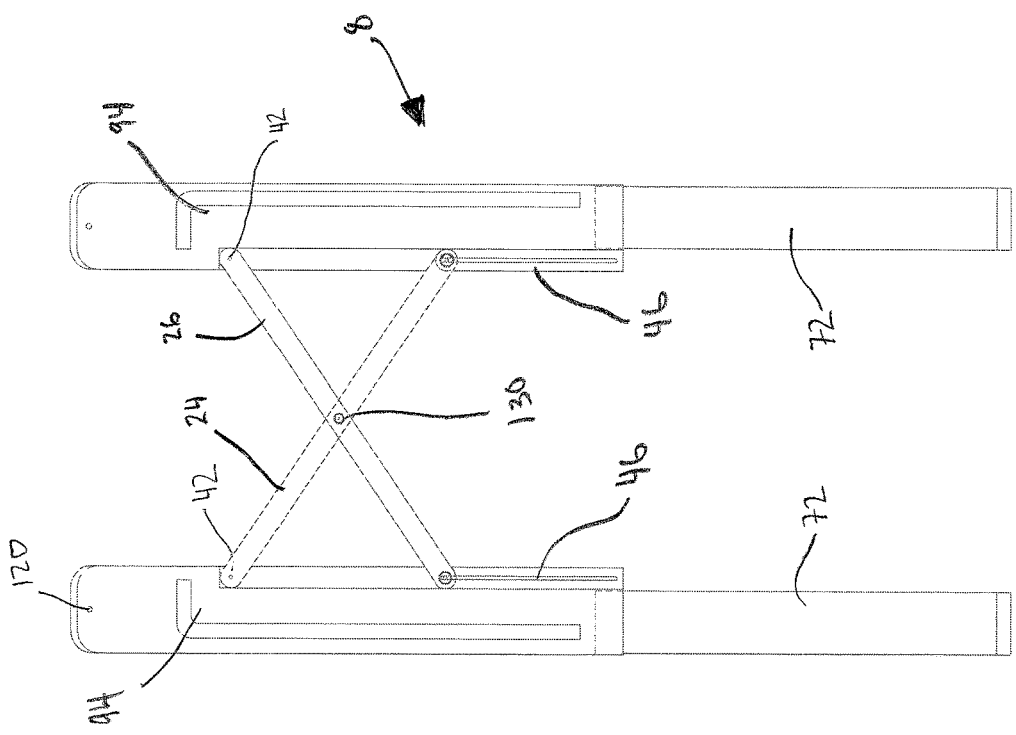
FIG. 10 is a top plan view of the portable storage sled formed in accordance with the present invention, showing the sled in an expanded state.
Figure 11:
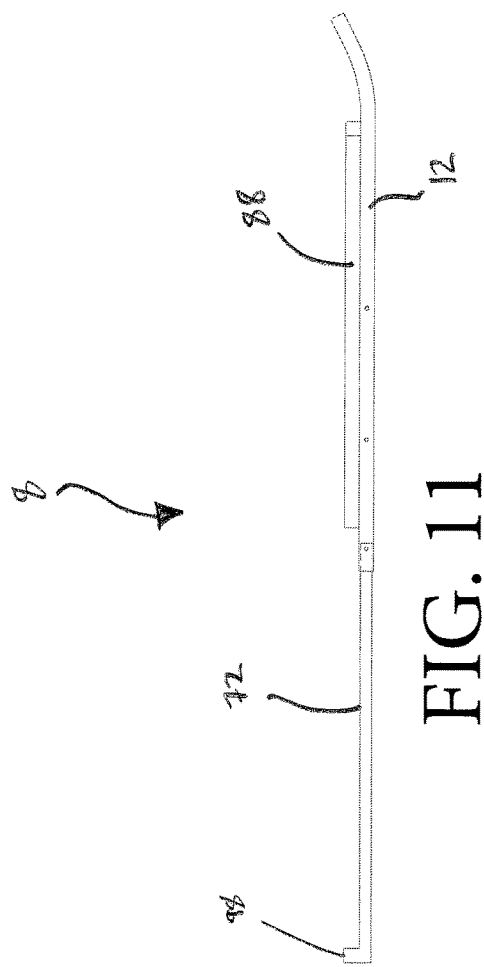
FIG. 11 is a right elevational view of the portable storage sled formed in accordance with the present invention, showing the sled in an expanded state.

The top surface 60 of each elongated member 10, 12 further includes a cooler mount 86. Each cooler mount 86 preferably comprises an elongated ridge 88 that extends upwardly from the top surface 60 of the elongated member 10, 12. The elongated ridge 88 includes a first portion 90 that extends at least partially along the axial length of the elongated member 10, 12 and a second portion 92 that extends perpendicularly from the first portion 90 towards the inner edge 34 of the elongated member 10, 12 in proximity to the first axial end 14 of the elongated member 10, 12. As can be seen in FIG. 2 of the drawings, the first and second portions 90, 92 of the elongated ridges 88 form corners 94. When the cooler 2 is situated on the sled 8, the front corners 96 of the bottom surface 62 of the cooler 2 rest within the corners 94 formed by the first and second portions 90, 92 of the ridges 88 so that the corners 94 resist forward and outward movement of the cooler 2 relative to the sled 8. To resist backward movement of the cooler 2 relative to the sled 8, each extension member 72 also includes a ridge 98 extending upwardly from the top surface 100 thereof that extends transversely across the member 72 in proximity to the second axial ends 76 thereof. In an alternative form of the present invention, the sled may be formed without extensions members 72 and the ridge 98 may be formed in proximity to the second axial ends 16 of the elongated members 10, 12.

Figure 15:
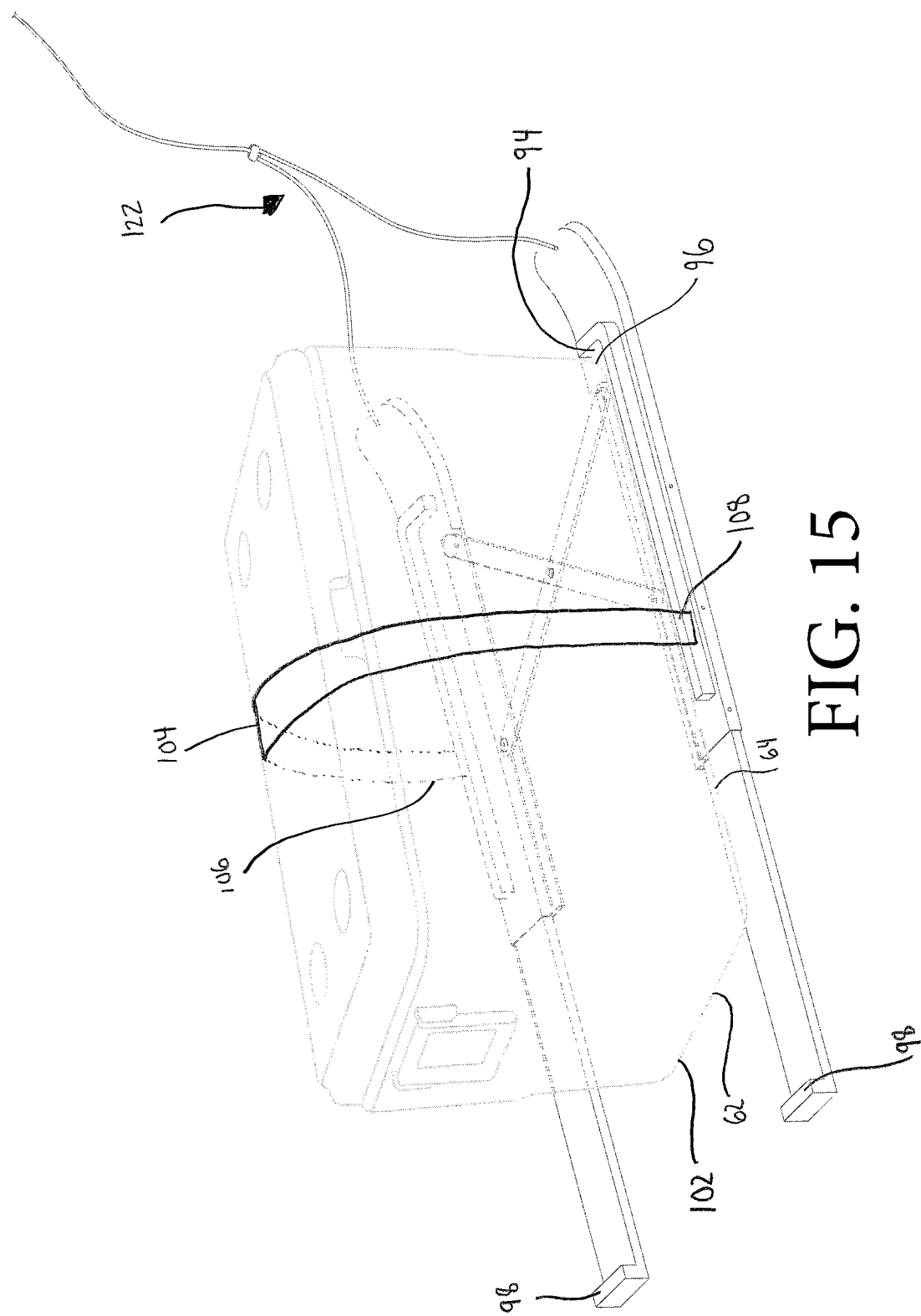
FIG. 15 is a right, top perspective view of the portable storage sled formed in accordance with the present invention, showing the sled in an expanded state with the cooler situated thereon.

To situate the cooler 2 on the sled 8, the width of the sled 8 is adjusted so that the front corners 96 of the bottom surface 62 of the cooler 2 are situated within the corners 94 formed by the first and second portions 90, 92 of the ridges 88. The extension members 72 are then extended so that the ridges 98 formed in proximity to the second axial ends 76 thereof are situated against a back edge 102 of the cooler 2. A strap 104 or other securing device may be used to further secure the cooler 2 to the sled 8. The strap 104 includes a first end 106 that is connected to the first elongated member 10 and a second end 108 that is connected to the second elongated member 12. As can be seen in FIG. 15 of the drawings, the strap 104 is positioned over the cooler 2 to hold the cooler 2 within the ridges 88 of the cooler mount 86. Furthermore, in another embodiment of the present invention, one or more of the ridges 88 may include one or more spaces 140 through which the strap 104 may passed or secured. Additionally, one or more of the extension members 72 may also include at least one space 140 through which a strap 104 may be passed or secured. For example, a horizontal strap 104 may be positioned over the cooler 2 and the first end thereof 106 may be passed through the space 140 in the ridge 88 of the first elongated member 10, and the second end 108 of the strap may be passed through the space 140 in the ridge 88 of the second elongated member 12. Furthermore, one or more straps may optionally be positioned axially over the cooler 2 and passed between the space 140 in the extension member 72, which is preferably formed in the extension member ridge 98, and another space 140 in the ridge that is preferably formed in the second portion 92 thereof.

Figure 16:
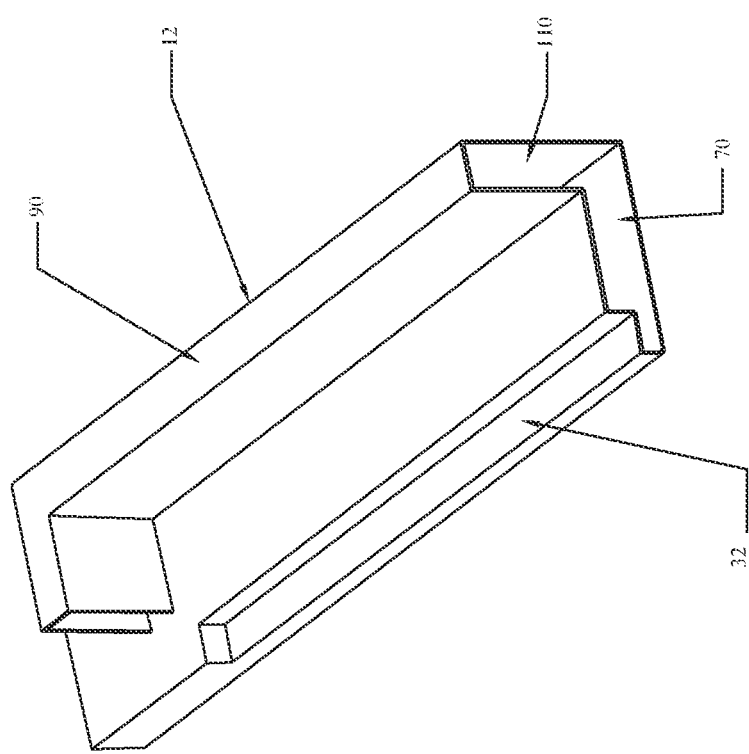
FIG. 16 is a rear, top perspective view of the portable storage sled formed in accordance with the present invention, showing the internal cavity in the elongated member and ridge portion.
Figure 19:
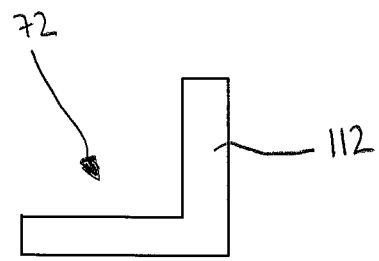
FIG. 19 is a rear cross-sectional view of the extension member of the sled formed in accordance with the present invention.

In another embodiment of the present invention, as shown in FIG. 16 of the drawings, at least the first portion 90 of each elongated ridge 88 includes an internal cavity 110 that extends into the internal cavity 70 of the elongated member 10, 12. Each extension member 72 further includes an elongated ridge 112 that extends upwardly from the top surface 100 thereof at least partially along the axial length of the extension member 72, as shown in FIG. 19 of the drawings. The elongated ridge 112 of each extension member 72 is received within the internal cavity 110 of the first portion 90 of the ridge 88 of each elongated member 10, 12 so that it is reciprocatingly movable therein as the extension member 72 is selectively extended and retracted therefrom.

Figure 12:
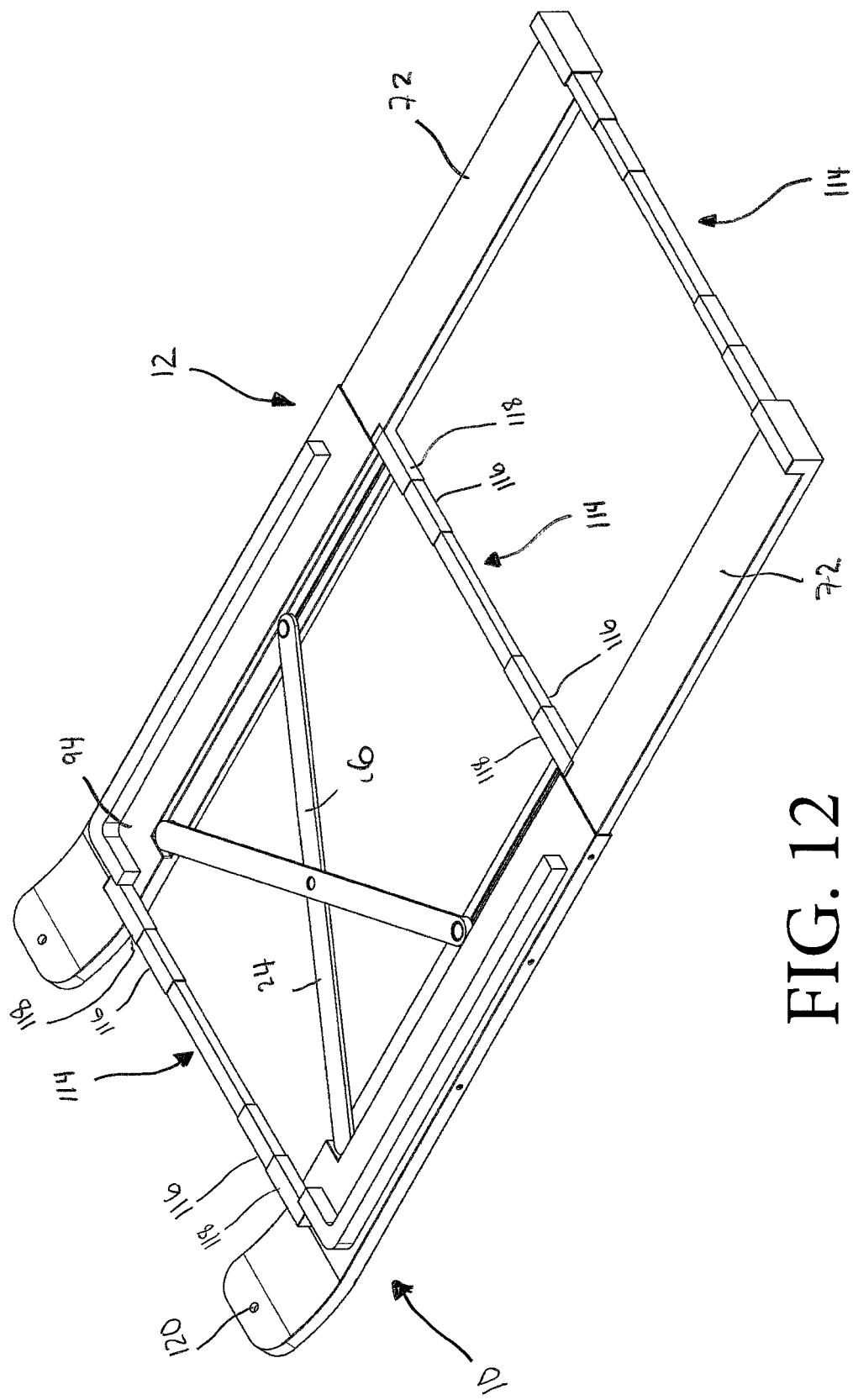
FIG. 12 is a left, top perspective view of the portable storage sled formed in accordance with the present invention, showing the sled in an expanded state.
Figure 13:
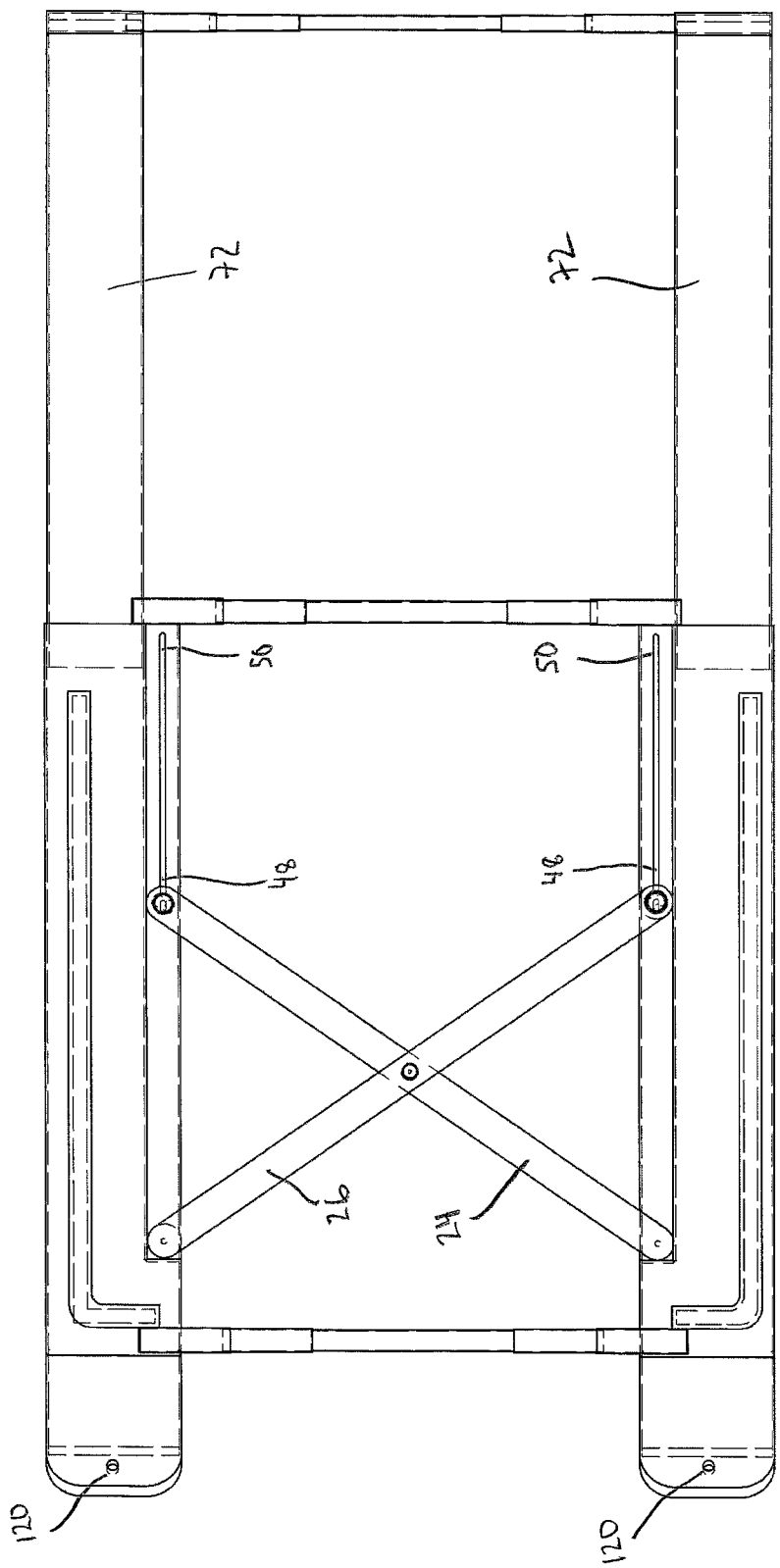
FIG. 13 is another top plan view of the portable storage sled formed in accordance with the present invention, showing the sled in an expanded state.
Figure 14:
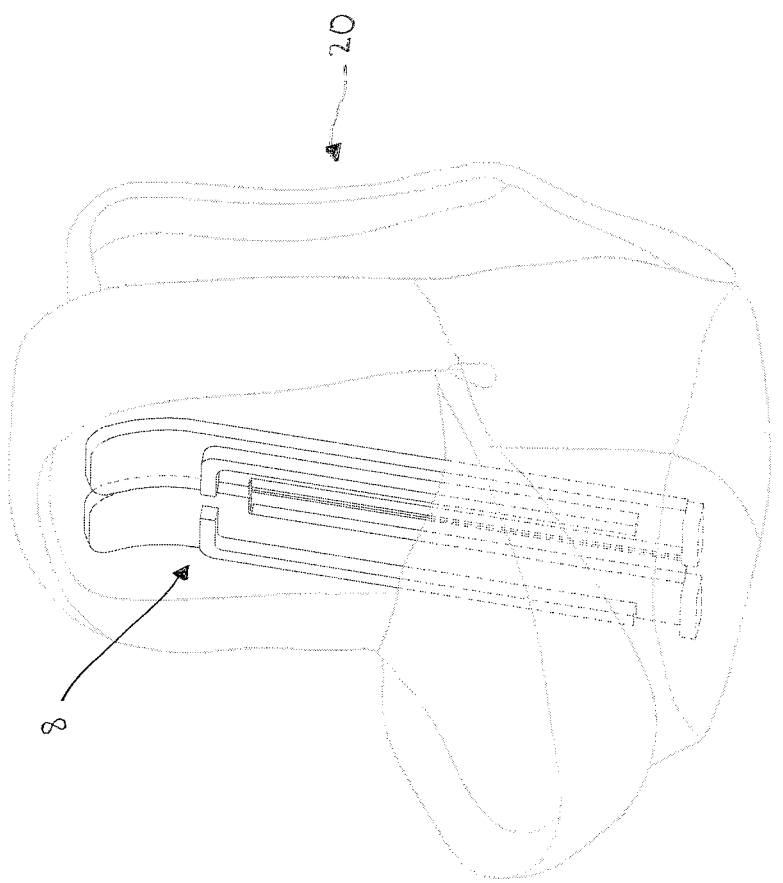
FIG. 14 is a right, top perspective view of the portable storage sled formed in accordance with the present invention, showing the sled in a collapsed state and stored in a backpack.

As can be seen in FIGS. 12 and 13 of the drawings, in another embodiment of the present invention, the first and second elongated members 10, 12 may be coupled to one another by one or more adjustment members 114 that extend transversely between the two elongated members 10, 12. More specifically, each adjustment member 114 includes at least a first telescoping member 116 and a second telescoping member 118 situated in proximity to each axial end thereof. The first telescoping member 116 is at least partially receivable within the second telescoping member 118 and is selectively extendable therefrom and retractable therein to adjust the overall length of the at least one adjustment member 114. When the sled 8 is in the expanded state, the telescoping members 116, 118 situated at the axial ends of the adjustment member 114 are extended. When the sled 8 is in the collapsed state, the first telescoping member 116 is received within the second telescoping member 118 and at least a portion of the adjustment member 114 is received within the first telescoping member 116. Although FIGS. 12 and 13 show the sled 8 having both a scissor connector 22 and three adjustment members 114, the sled 8 may be constructed with just the scissor connector 22 and not the adjustment members 114, with just the adjustment members 114 and not the scissor connector 22 or with a combination of both the scissor connector 22 and the adjustment members 114.

As can be seen in FIGS. 3-7, 9-13 and 15 of the drawings, the first axial ends 14 of the elongated members 10, 12 may also include at least one opening 120 formed through the thickness thereof. A pull strap or leash 122 may be inserted through the openings so that a user may pull the sled utilizing the leash. Similarly, the second axial ends 16 of the elongated members 10, 12 may also include at least one opening (not shown) formed through the thickness thereof to also receive a pull strap or leash 122.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A portable storage sled for transporting equipment, the equipment being situated on the portable storage sled, the portable storage sled comprising:
   a first elongated member;
   at least a second elongated member joined to the first elongated member;
   a first extension member, the first extension member being at least partially receivable within the first elongated member and being selectively extendable therefrom and retractable therein to adjust the overall length of the first elongated member; and
   a second extension member, the second extension member being at least partially receivable within the second elongated member and being selectively extendable therefrom and retractable therein to adjust the overall length of the second elongated member;
   wherein each of the first elongated member and the second elongated member includes a top side, a bottom side disposed opposite the top side, a first axial end, a second axial end disposed opposite the first axial end, an outer edge and an inner edge disposed opposite the outer edge;
   wherein the first elongated member and the second elongated member are situated opposite and parallel to one another; and
   wherein the portable storage sled is selectively adjustable between a first position and a second position, wherein in the first position, the portable storage sled is collapsed and the first elongated member and the second elongated member are in situated in close proximity to one another, and wherein in the second position, the portable storage sled is expanded and the first elongated member and the second elongated member extend outwardly from one another.

2. A portable storage sled for transporting equipment as defined by claim 1, which further comprises:
an equipment mount, the equipment mount being situated on the top side of each of the first elongated member and the second elongated member.

3. A portable storage sled for transporting equipment as defined by claim 2, wherein the equipment mount comprises:
a first elongated ridge, the first elongated ridge extending upwardly from the top side of the first elongated member at least partially along the axial length thereof; and
at least a second elongated ridge, the second elongated ridge extending upwardly from the top side of the second elongated member at least partially along the axial length thereof;
wherein the portable storage sled is selectively adjustable between the first position and the second position to position the first elongated ridge and the second elongated ridge in close proximity to the equipment situated on the portable storage sled.

4. A portable storage sled for transporting equipment as defined by claim 3, wherein the equipment mount further comprises:
a third elongated ridge, the third elongated ridge extending upwardly from the top side of the first elongated member and extending transversely at least partially between the inner edge and the outer edge of the first elongated member; and
a fourth elongated ridge, the fourth elongated ridge extending upwardly from the top side of the second elongated member and extending transversely at least partially between the inner edge and the outer edge of the second elongated member.

5. A portable storage sled for transporting equipment as defined by claim 3, wherein the equipment mount further comprises:
at least one securing strap, the at least one securing strap having a first axial end and a second axial end disposed opposite the first axial end;
wherein the first axial end is selectively engageable with the first elongated ridge and the second axial end is selectively engageable with second elongated ridge; and
wherein the at least one securing strap is in communication with at least a portion of the equipment situated on the portable storage sled.

6. A portable storage sled for transporting equipment as defined by claim 1, which further comprises:
at least one securing strap, the at least one securing strap having a first axial end and a second axial end disposed opposite the first axial end;
wherein the first axial end of the securing strap is selectively engageable with a portion of the first elongated member and the second axial end of the securing strap is selectively engageable with a portion of the second elongated member; and
wherein the at least one securing strap is in communication with at least a portion of the equipment situated on the portable storage sled.

7. A portable storage sled for transporting equipment as defined by claim 1, wherein:
at least one of the first elongated member and the first extension member has at least one protrusion formed thereon, and at least the other one of the first elongated member and the first extension member has a plurality of spaced apart holes formed therein and at least partially along the axial length thereof, and wherein the overall length of the first elongated member may be fixed by aligning the protrusion in the first extension member with one of the holes in the first elongated member; and
at least one of the second elongated member and the second extension member has at least one protrusion formed thereon, and at least the other one of the second elongated member and the second extension member has a plurality of spaced apart holes formed therein and at least partially along the axial length thereof, and wherein the overall length of the second elongated member may be fixed by aligning the protrusion in the second extension member with one of the holes in the second elongated member.

8. A portable storage sled for transporting equipment as defined by claim 1, wherein:
each of the first extension member and the second extension member includes a top side, a bottom side disposed opposite the top side, a first axial end and a second axial end disposed opposite the first axial end, an outer edge and an inner edge disposed opposite the outer edge;
wherein the first extension member includes a first ridge extending upwardly from the top side thereof and transversely at least partially between the inner edge and the outer edge of the first extension member in proximity to the second axial end thereof; and
wherein the second extension member includes a second ridge extending upwardly from the top side thereof and transversely at least partially between the inner edge and the outer edge of the second extension member in proximity to the second axial end thereof.

9. A portable storage sled for transporting equipment as defined by claim 1, which further comprises:
a first connecting member and a second connecting member, each of the first connecting member and the second connecting member having a first axial end and a second axial end disposed opposite the first axial end;
wherein the first axial end of the first connecting member is selectively engageable with the first elongated member and the first axial end of the second connecting member is selectively engageable with the second elongated member; and
wherein the second axial end of the first connecting member is selectively engageable with the second elongated member and the second axial end of the second connecting member is selectively engageable with the first elongated member.

10. A portable storage sled for transporting equipment as defined by claim 9, wherein:
the first elongated member includes a first recessed portion extending at least partially along the inner edge thereof;
the second elongated member includes a second recessed portion extending at least partially along the inner edge thereof;
wherein each of the first recessed portion and the second recessed portion includes a first axial end and a second axial end disposed opposite the first axial end;
wherein each of the first recessed portion and the second recessed portion includes slot extending at least partially along the axial length thereof, the slot being situated in proximity to the second axial end of the respective recessed portion and extending at least partially through the thickness of the respective recessed portion;

wherein the first axial end of the first connecting member is pivotally joined to the first recessed portion in proximity to the first axial end thereof;

wherein the first axial end of the second connecting member is pivotally joined to the second recessed portion in proximity to the first axial end thereof;

wherein the second axial end of the first connecting member is mechanically engaged with the slot formed in the second elongated member and selectively movable along the axial length of slot formed in the second elongated member;

wherein the second axial end of the second connecting member is mechanically engaged with the slot formed in the first elongated member and selectively movable along the axial length of slot formed in the first elongated member;

wherein the second axial ends of the first connecting member and the second connecting member are selectively movable along the axial length of their respective slots to adjust the distance between the first elongated member and the second elongated member.

11. A portable storage sled for transporting equipment as defined by claim 1, which further comprises:

a first elongated ridge, the first elongated ridge extending upwardly from the top side of the first elongated member at least partially along the axial length thereof; and a second elongated ridge, the second elongated ridge extending upwardly from the top side of the second elongated member at least partially along the axial length thereof;

wherein each of the first extension member and the second extension member includes a top side, a bottom side disposed opposite the top side, a first axial end and a second axial end disposed opposite the first axial end, an outer edge and an inner edge disposed opposite the outer edge;

wherein the first extension member includes a third elongated ridge extending upwardly from the top side thereof, the third elongated ridge extending axially at least partially along the outer edge of the first extension member;

wherein the second extension member includes a fourth elongated ridge extending upwardly from the top side thereof, the fourth elongated ridge extending axially at least partially along the outer edge of the second extension member;

wherein each of the first elongated member, second elongated member, first elongated ridge and second elongated ridge includes an internal cavity;

wherein the internal cavity of the first elongated member is in communication with the internal cavity of the first elongated ridge and the internal cavity of the second elongated member is in communication with the internal cavity of the second elongated ridge;

wherein the first extension member and the third elongated ridge thereof are at least partially received within the internal cavity of first elongated member and the internal cavity of the first elongated ridge, respectively, and are selectively extendable therefrom and retractable therein to adjust the overall length of the first elongated member;

wherein the second extension member and the fourth elongated ridge thereof are at least partially received within the internal cavity of second elongated member and the internal cavity of the second elongated ridge, respectively, and are selectively extendable therefrom and retractable therein to adjust the overall length of the second elongated member; and wherein the portable storage sled is selectively adjustable between the first position and the second position to position the first elongated ridge and the second elongated ridge in close proximity to the equipment situated on the portable storage sled.

12. A portable storage sled for transporting equipment as defined by claim 11, wherein:

the first extension member includes a fifth ridge extending upwardly from the top side thereof and transversely at least partially between the inner edge and the outer edge of the first extension member in proximity to the second axial end thereof;

wherein the second extension member includes a sixth ridge extending upwardly from the top side thereof and transversely at least partially between the inner edge and the outer edge of the second extension member in proximity to the second axial end thereof; and wherein the first extension member and the second extension member are selectively extendable and retractable from the first elongated member and the second elongated member, respectively, to position the fifth ridge and the sixth ridge in close proximity to the equipment situated on the portable storage sled.

13. A portable storage sled for transporting equipment as defined by claim 12, wherein:

the first elongated member includes a seventh elongated ridge, the seventh elongated ridge extending upwardly from the top side of the first elongated member and extending transversely at least partially between the inner edge and the outer edge of the first elongated member; and the second elongated member includes an eighth elongated ridge, the eighth elongated ridge extending upwardly from the top side of the second elongated member and extending transversely at least partially between the inner edge and the outer edge of the second elongated member;

wherein the first extension member and the second extension member are selectively extendable and retractable from the first elongated member and the second elongated member, respectively, to position the equipment situated on the portable storage sled between the fifth ridge, the sixth ridge, the seventh ridge and the eighth ridge.

14. A portable storage sled for transporting equipment as defined by claim 1, which further comprises:

a tow handle, the tow handle being joined to at least one of the first elongated member and the second elongated member.

15. A portable storage sled for transporting equipment, the equipment being situated on the portable storage sled, the portable storage sled comprising:

a first elongated member;

at least a second elongated member joined to the first elongated member; and at least one connecting member, the at least one connecting member having a first axial end and a second axial end disposed opposite the first axial end, the first axial end being joined to the first elongated member and the second axial end being joined to the second elongated member, wherein the axial length of the at least one connecting member is selectively adjustable to adjust the distance between the first elongated member and the second elongated member, wherein each of the first elongated member and the second elongated member includes a top side, a bottom side disposed opposite the top side, a first axial end, a second axial end disposed opposite the first axial end, an outer edge and an inner edge disposed opposite the outer edge;

wherein the first elongated member and the second elongated member are situated opposite and parallel to one another; and wherein the portable storage sled is selectively adjustable between a first position and a second position, wherein in the first position, the portable storage sled is collapsed and the first elongated member and the second elongated member are in situated in close proximity to one another, and wherein in the second position, the portable storage sled is expanded and the first elongated member and the second elongated member extend outwardly from one another.

16. A portable storage sled for transporting equipment as defined by claim 15, wherein the at least one connecting member comprises at least a first telescoping member and a second telescoping member, the second telescoping member being at least partially receivable within the first telescoping member and being selectively extendable therefrom and retractable therein to adjust the overall length of the connecting member.

17. A portable storage sled for transporting equipment, the equipment being situated on the portable storage sled, the portable storage sled comprising:

a first elongated member, at least a second elongated member joined to the first elongated member, the first elongated member and the second elongated member being situated opposite and parallel to one another, each of the first elongated member and the second elongated member including a top side, a bottom side disposed opposite the top side, a first axial end, a second axial end disposed opposite the first axial end, an outer edge and an inner edge disposed opposite the outer edge, the first elongated member including a first elongated ridge, the first elongated ridge extending upwardly from the top side of the first elongated member at least partially along the axial length thereof, the second elongated member including a second elongated ridge, the second elongated ridge extending upwardly from the top side of the second elongated member at least partially along the axial length thereof, the first elongated member including an third ridge extending upwardly from the top side thereof and extending transversely at least partially between the inner edge and the outer edge thereof, the second elongated member including a fourth ridge extending upwardly from the top side thereof and extending transversely at least partially between the inner edge and the outer edge thereof;

a first extension member, the first extension member being at least partially receivable within the first elongated member and being selectively extendable therefrom and retractable therein to adjust the overall length of the first elongated member, a second extension member, the second extension member being at least partially receivable within the second elongated member and being selectively extendable therefrom and retractable therein to adjust the overall length of the second elongated member, each of the first extension member and the second extension member including a top side, a bottom side disposed opposite the top side, a first axial end and a second axial end disposed opposite the first axial end, an outer edge and an inner edge disposed opposite the outer edge, the first extension member including a fifth ridge extending upwardly from the top side thereof and transversely at least partially between the inner edge and the outer edge of the first extension member in proximity to the second axial end thereof, the second extension member including a sixth ridge extending upwardly from the top side thereof and transversely at least partially between the inner edge and the outer edge of the second extension member in proximity to the second axial end thereof; and a first connecting member and a second connecting member, each of the first connecting member and the second connecting member having a first axial end and a second axial end disposed opposite the first axial end, the first axial end of the first connecting member being selectively engageable with the first elongated member and the first axial end of the second connecting member being selectively engageable with the second elongated member, the second axial end of the first connecting member being selectively engageable with the second elongated member and the second axial end of the second connecting member being selectively engageable with the first elongated member;

wherein the portable storage sled is selectively adjustable between a first position and a second position, wherein in the first position, the portable storage sled is collapsed and the first elongated member and the second elongated member are in situated in close proximity to one another, and wherein in the second position, the portable storage sled is expanded and the first elongated member and the second elongated member extend outwardly from one another;

wherein the portable storage sled is selectively adjustable between the first position and the second position to position the first elongated ridge and the second elongated ridge in close proximity to the equipment situated on the portable storage sled; and wherein the first extension member and the second extension member are selectively extendable and retractable from the first elongated member and the second elongated member, respectively, to position the equipment situated on the portable storage sled between the third ridge, the fourth ridge, the fifth ridge and the sixth ridge.

18. A portable storage sled for transporting equipment as defined by claim 17, which further comprises:

at least one securing strap, the at least one securing strap having a first axial end and a second axial end disposed opposite the first axial end;

wherein the first axial end of the securing strap is selectively engageable with a portion of the first elongated member and the second axial end of the securing strap is selectively engageable with a portion of the second elongated member; and wherein the at least one securing strap is in communication with at least a portion of the equipment situated on the portable storage sled.

19. A portable storage sled for transporting equipment as defined by claim 17, which further comprises:

at least a first securing strap and a second securing strap, each of the first securing strap and the second securing strap having a first axial end and a second axial end disposed opposite the first axial end;

wherein the first axial end of the first securing strap is selectively engageable with a portion of the first elongated member and the second axial end of the first securing strap is selectively engageable with a portion of the first extension member;

wherein the first axial end of the second securing strap is selectively engageable with a portion of the second elongated member and the second axial end of the second securing strap is selectively engageable with a portion of the second extension member;

wherein the first securing strap and the second securing strap are in communication with at least a portion of the equipment situated on the portable storage sled.

\* \* \* \* \*